United States Patent [19]

Piepho

[11] 4,234,424
[45] Nov. 18, 1980

[54] APPARATUS FOR THE PURIFICATION OF OILY EMULSIONS, SOLUTIONS, AND INDUSTRIAL WASTE WATERS

[76] Inventor: Ralf F. Piepho, Deisterstr. 58, 5015 Wennigsen, BRD, Fed. Rep. of Germany

[21] Appl. No.: 936,706

[22] Filed: Aug. 25, 1978

Related U.S. Application Data

[63] Continuation of Ser. No. 827,250, Aug. 28, 1977, abandoned.

[51] Int. Cl.² ............................................. B01D 33/32
[52] U.S. Cl. .................................... 210/771; 210/783
[58] Field of Search .............. 210/400, 401, 241, 386, 210/77, 241, 387, 68, 77; 162/348; 100/151–154, 118–120; 34/163, 208, 209, 111, 116, 117, 118, 119, 120, 121

[56] References Cited

U.S. PATENT DOCUMENTS

| | | | |
|---|---|---|---|
| 2,734,377 | 2/1956 | Traver | 210/401 |
| 2,964,191 | 12/1960 | Arnold et al. | 210/241 |
| 3,244,287 | 4/1966 | Staunton | 210/387 |
| 3,864,266 | 2/1975 | Dietrick | 210/387 |
| 3,896,030 | 7/1975 | Bahr | 210/386 |

*Primary Examiner*—Frank Sever
*Attorney, Agent, or Firm*—Norman Lettvin

[57] ABSTRACT

The invention relates to an apparatus for the purification of oily emulsions, solutions, industrial waste waters or the like. The apparatus includes a reaction container, at least one discharge connecting piece, an inflow trough and a band filter fitted with a fleece band, a filtrate container arranged under it and a sludge container provided at the discharge end of the band filter.

2 Claims, 5 Drawing Figures

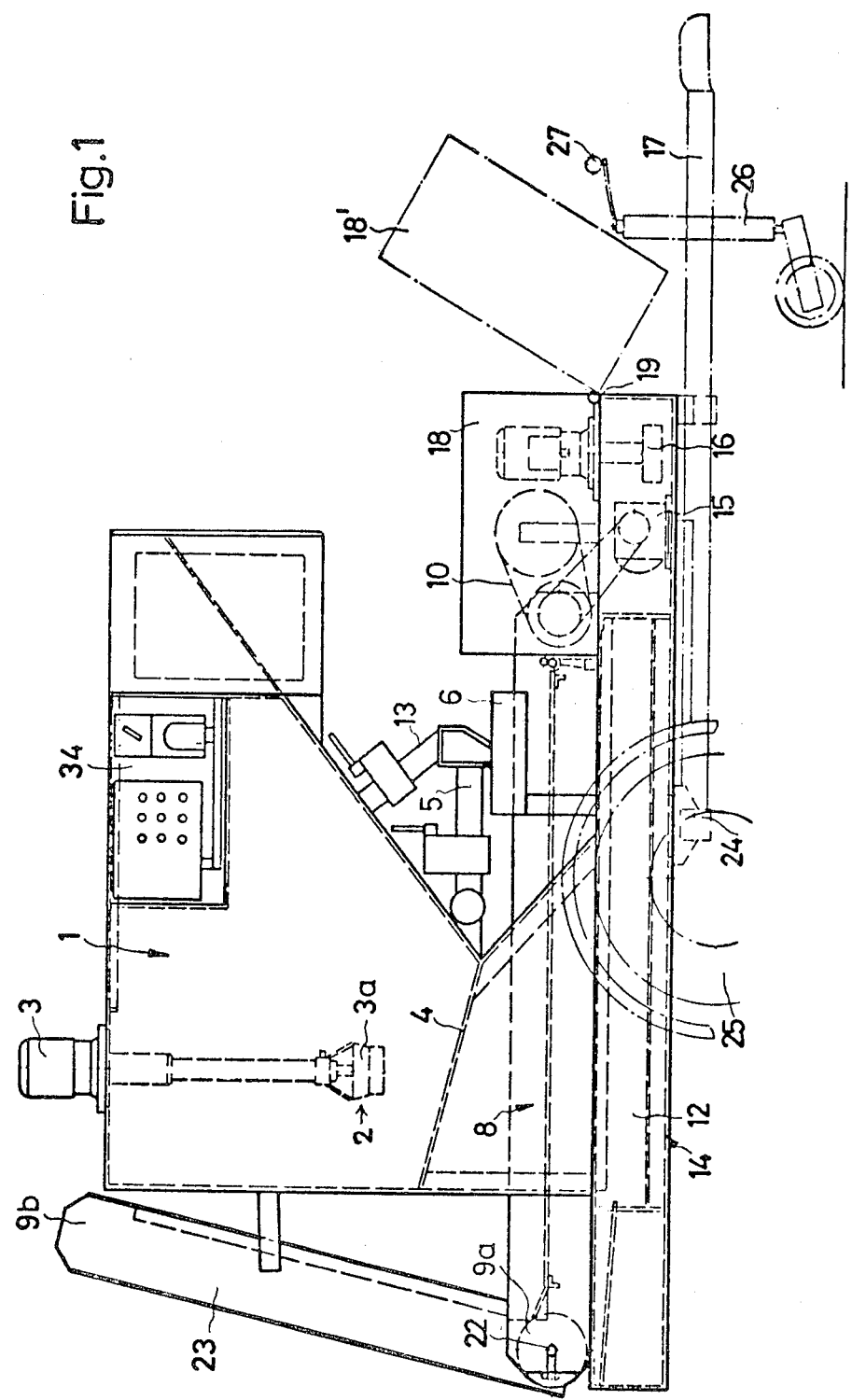

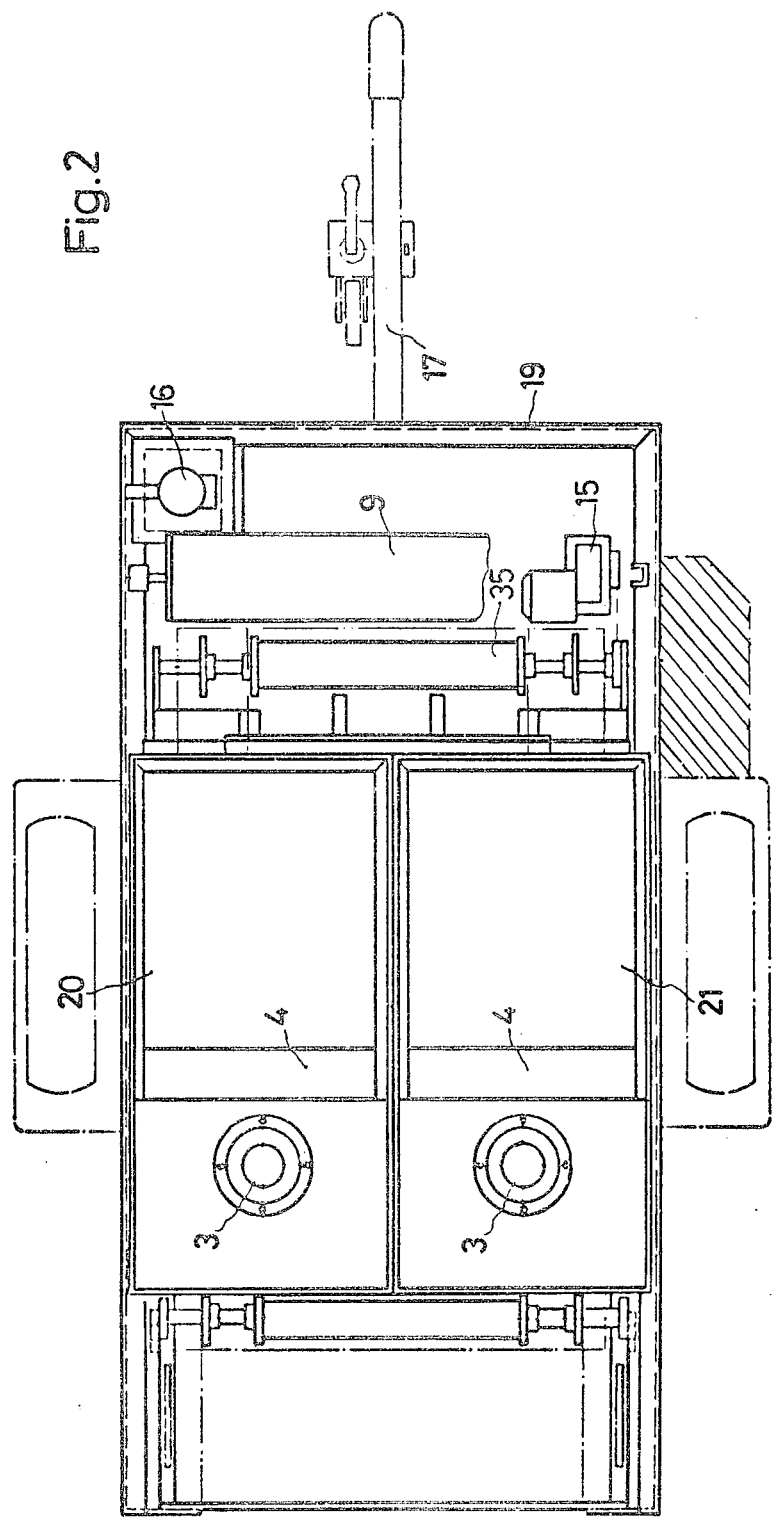

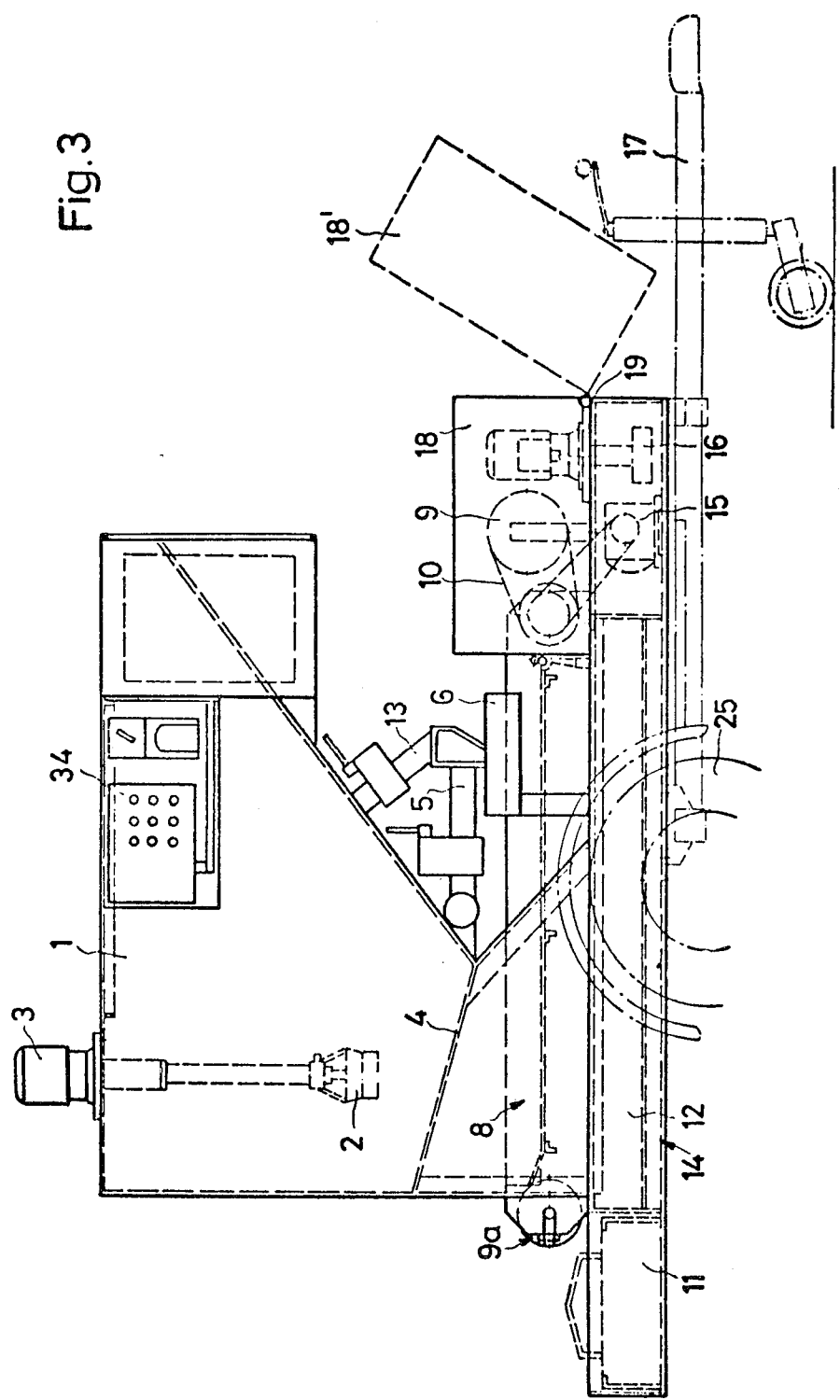

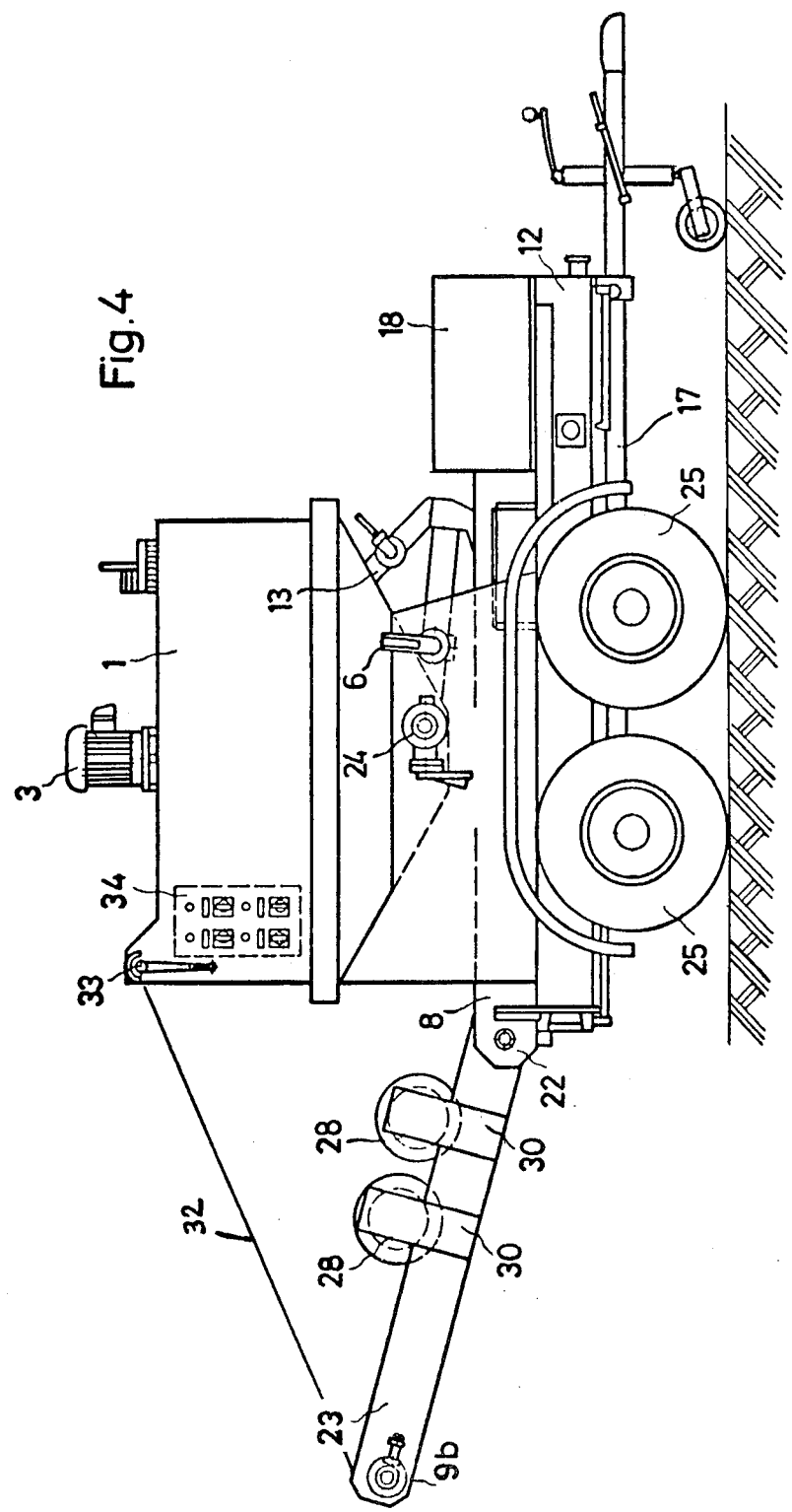

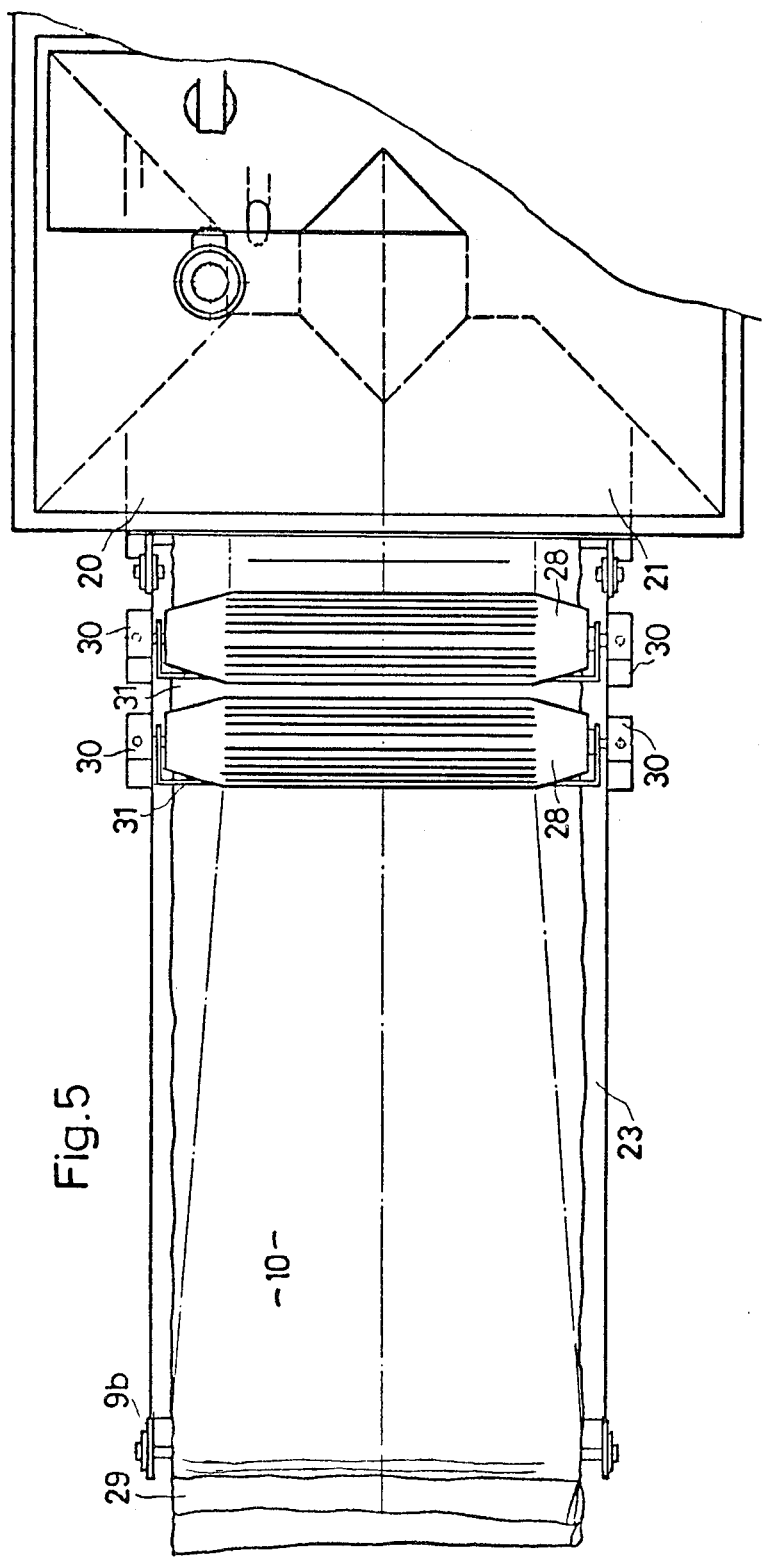

APPARATUS FOR THE PURIFICATION OF OILY EMULSIONS, SOLUTIONS, AND INDUSTRIAL WASTE WATERS

This is a continuation of application Ser. No. 827,250, filed Aug. 28, 1977, now abandoned.

FIELD OF THE INVENTION

This invention relates to a water purification apparatus for purifying and treatment of oily waste water, and to effect sludge removal, and more particularly to a mobile expression of such an apparatus.

BACKGROUND OF THE INVENTION

Oily industrial waste waters can seriously disturb biological drainage processes. The emulsified oil particles hamper normal aerobic biological purification in settling installations as the oil film on the water surface prevents the absorption of atmospheric oxygen.

Therefore, wash waters from such industrial installations as oil and gasoline separators, paper and carpet factories, barrel washing plants, factories for the degreasing of machine parts, and plants using coolant emulsions for machining operations must be purified to meet government standards as to allowable percentages of mineral oils.

One type of purification process with which the apparatus of the instant invention is concerned involves chemical separation. Such a process, to be low cost, uses demulsifying products and chemically reacting adsorbents to achieve an adsorption of the separating reagent as well as an extremely high, fine distribution of the substances to be eliminated. Absorbed dirt particles and oily organic substances become firmly bound and finely distributed in a resulting sludge cake. These adsorbed dirt particles are not dissolved by normal mechanical treatments so that their reemergence under normal environmental conditions is virtually excluded.

The process for purification by chemical separation includes collecting the oily waste waters, adding a demulsifier if the oil content exceeds 2% and separating, or draining, the oil which floats to the surface. A powdered separating reagent may be mixed into the emulsion with adsorption occurring in a very short period of time.

Another object of this invention is to provide an improved purification apparatus that can be transported to the site where contaminated emulsions, solutions, industrial waste waters or the like occur.

The performance of prior waste water treatment and sludge removal apparatus has been hampered by the amount of "down-time" consumed while the treatment chamber of the apparatus was filled with the waste water to be treated. It was also discovered that sludge drained from a treatment chamber did not normally have sufficient time to dry.

Thus, a further object of this invention is to increase overall performance in waste water treatment by providing in an apparatus two treatment chambers, such that one may operate while the second is being filled, and by also providing that sludge produced by the apparatus is provided with an elongated drying path.

Another object is to provide an apparatus for handling waste taken from a solution by a continuous napped, or fleece-like, filter band of a disposable character such as a paper-like band.

BRIEF DESCRIPTION OF THE DRAWINGS

Examples of execution of the invention are represented in the drawings and are described in the following.

FIG. 1 shows a working-up apparatus provided with a chassis in side view;

FIG. 2 an apparatus according to FIG. 1 in plan, in which the reaction container is subdivided into two chambers;

FIG. 3 an apparatus in side view, in which, instead of the lengthened band filter part there is provided a catching box for the sludge;

FIG. 4 an apparatus according to FIG. 1 with a two-axle chassis and the lengthened swingably mounted band filter part; and FIG. 5 a plan view of the swingable discharge and of the band filter part with press rollers.

DETAILED DESCRIPTION OF THE DRAWINGS

In the example of a preferred form executed according to FIG. 1, the apparatus for the processing of used emulsions, solutions, industrial waste waters or the like has a reaction chamber, or tank, 1 which is equipped with a mixing turbine 2 which is driven through a motor 3 supported above the chamber. In the reaction container 1 there is collected in the region of the bottom 4 the sludge solution, which is drawn off through a connecting pipe piece 5 and fed to an inflow trough 6 that is laterally elongated to spread the sludge miture received from pipe piece 5. This inflow trough 6 has a widened bottom provided with perforations. Through these perforations the sludge falls onto a wide band filter 8, whose endless conveyor belt consists of mesh wire or the like. To the upper surface of the conveyor belt there is supplied from a roll 9 a fleece, or napped, band 10 which runs with the upper course of the conveyor belt 8 up to the discharge end 9a of the band filter and takes on the sludge. On the discharge end there is provided a sludge tank 11 which receives the sludge together with the fleece band. In the transport of the sludge along the band filter the liquid separating from the sludge passes through the fleece band 10, runs through the meshes of the conveyor belt 8 and passes down into a filtrate container 12 arranged underneath the band filter. The liquid collecting above the sludge layer in the lower portion of the reaction container 1 is drawn off through a connecting pipe piece 13 and fed to the inflow trough 6, from which the liquid passes onto the band filter 8 and into the filtrate container 12.

The apparatus may be mounted on a motor vehicle trailer 14. The fleece roll 9, the drive 15 for the band filter 8 and the pump 16 associated with the filtrate container 12 are provided on the end facing the draw-rod 17. These parts are enclosed by a casing, the cover 18 of which is hinged about a horizontal axis 19. In the swung-out position the cover 18 occupies the position shown in dot-and-dashed lines in FIG. 1.

On the rear end of the trailer there is provided the sludge tank 11.

Preferably, however, the vehicle trailer is omitted and the filtrate container 12 arranged under the apparatus is constructed to also serve as chassis and carrier of the traveling mechanism upon which axles 24, wheels 25 and draw-rod 17 are secured in a suitable manner directly to the filtrate container 12. If desired, the draw-rod 17, which has the function of a wagon pole, can be arranged detachably. In the front part of the draw-rod 17 there is arranged a support wheel 26 which is extensible and retractable over the crank 27.

In the modified form example of execution according to FIGS. 2 and 5 the reaction container has two chambers 20, 21, to each of which there is allocated a separate mixing turbine 2. While the one chamber is being filled, in the other chamber the working-up operation as described above can be running.

In the example of execution according to FIGS. 1, 4 and 5 the band filter 8 has a discharge end section 23 hinged about a horizontal axis 22, which discharge end section is designed to extend beyond the end of the trailer in the unfolded position. The part extending beyond the rear end of the trailer is designed to extend upwardly at a pitch of about 15° in its operating position, with respect to the portion of the conveyor 8 fastened to the trailer. This hingeable part 23 is provided with a filtrate container which in this case is provided with a gradient to drain toward the filtrate container, which is mounted on the trailer. The filtrate runs, accordingly, into the tank 12 and can be drawn off from tank 12 with a pump 16.

By using the foldable part of the band filter the length of the band filter 8 is increased, and the drying interval for the sludge is increased. At the discharge end of part 23 there is provided a sludge tank which receives the sludge and the fleece band.

In pursuance of the idea of the invention, in FIG. 4 on the fold-out part 23 of the band filters there are suspendably arranged squeezing rollers 28, which are again to be seen in FIG. 5 in a plan view. These rollers made preferably of hard rubber with a steel core, which press with their weight on the filter cake 10', situated on the fleece band and moving through with this under the squeezing rollers, so that a further constituent of water or liquid is pressed or squeezed out of the filter cake and a relatively dry crumbly material results. At 29 there is shown the fleece band dropping from the endless conveyor belt. This fleece band is preferably a paper fleece.

The squeezing rollers 28 are borne in lateral brackets 30 movable up and down in direction radial of the rollers, and carry in each case a blade-form stripper 31 which lies with one edge against the surface of the roller to scrape off the roller and discharge onto the filter cake any material sticking to the surface of the roller. In FIG. 5 there is shown a reaction container with two chambers 20 and 21, in which the emulsion to be purified or to be dissolved is worked up with addition of the reagent. The separation of the emulsion takes place in these chambers, and in this manner there can be carried out virtually a continuous operation by mixing reagent with the emulsion to be separated in the one chamber, while the mixture is just being run off from the other chamber, i.e., let off onto the band filter. The hingeable part of the band filter that carries the reference number 23, can be of various length and is connected over a draw cable 32 with a winch 33 in order to fold it up or to lower it to a varying distance. It can, however, also be provided with laterally spaced supports (not shown) which would swing down to support the folded-down part 23 upon the ground. At 34 there is to be seen the controls mounted on a panel of the apparatus. In FIG. 4 there is designated a valve 24 through which the reaction container may be selectively emptied. The deflection roll 9b for the conveyor belt, on which the napped filter band rests, and which filter band preferably consists of a mesh wire, is shiftably arranged at the outer end of the foldable part of the band filter, so that the conveyor belt can be correspondingly tensioned. The rear deflection roller for the conveyor belt is designated with 35. It is clearly to be perceived from FIG. 2. The drive for the conveyor belt is designated at 15.

While one form of the invention has been described, it will be understood that the invention may be utilized in other forms and environments, so that the purpose of the appended claims is to cover all such forms of devices not disclosed but which embody the invention described herein.

I claim:

1. A method for the treatment, separation and air drying of sludge from a liquid-sludge mixture comprising the steps of:

treating the liquid-sludge mixture in a container means so as to separate the sludge from the liquid-sludge mixture;

discharging the liquid-sludge mixture under gravity from the container means into an elongated spreading trough means located beneath the container means;

discharging a lateral spread of the liquid-sludge mixture under gravity from the laterally elongated spreading trough means onto only a portion of a napped filter strip that is moving beneath the trough means while resting on the upper course of a continuously moving conveyor means, the conveyor means including a moving, endless, foraminous conveyor belt trained over laterally spaced rollers, thereby providing the upper, elongated belt course adapted to move from a first end toward a discharge end and a lower elongated belt course, below said upper belt course, adapted to return from said discharge end to said first end;

removing the liquid component of the liquid-sludge mixture by permitting said liquid component to pass by gravity through the filter strip and foraminous conveyor belt courses to expose the liquid-sludge residue to air for a substantial portion of the elongated belt course so as to provide a substantially dry sludge residue by the time the moving filter strip reaches the discharge end of the upper belt course;

receiving in an elongated filtrate-receiving container, positioned to lie beneath the lower course of said endless belt, filtrate that has passed through the filter strip and through both courses of the foraminous conveyor belt; and discharging the filter strip with dried sludge residue thereon from the discharge end of the upper course of the endless belt as the endless belt completes its transport of the filter strip along the upper course of the belt.

2. A method for the treatment, separation and air drying of sludge from a liquid-sludge mixture comprising the steps of:

effecting within a confined space a preliminary settling of heavier liquid-sludge components from the liquid-sludge mixture, discharging the settled heavier liquid-sludge components under gravity in a laterally elongated discharge spread onto a longitudinally moving, elongated, consumable filter strip;

continuously conveying the filter strip with the laterally elongated discharge spread deposited thereon over an elongated course;

remaining the liquid component of the liquid-sludge by permitting said liquid component to pass by gravity through the filter strip over the length of the elongated course to expose said heavier liquid-sludge components to air, whereby the residue of sludge on the filter strip gradually dries; and discharging the filter strip and residue of liquid-sludge from the end of the course.

* * * * *